United States Patent [19]

Okawa et al.

[11] Patent Number: 5,238,967

[45] Date of Patent: Aug. 24, 1993

[54] FOAMABLE ORGANOSILOXANE COMPOSITION

[75] Inventors: Tadashi Okawa; Manabu Suto, both of Chiba, Japan

[73] Assignee: Dow Corning Toray Silicone Co., Ltd, Tokyo, Japan

[21] Appl. No.: 7,436

[22] Filed: Jan. 22, 1993

[30] Foreign Application Priority Data

Jan. 30, 1992 [JP] Japan .................. 4-040082

[51] Int. Cl.$^5$ ................................. C08J 9/02
[52] U.S. Cl. ...................... 521/77; 521/134; 521/154; 528/15; 528/18; 528/31
[58] Field of Search .................. 521/154, 77, 134; 528/15, 18, 31

[56] References Cited

U.S. PATENT DOCUMENTS

| | | | |
|---|---|---|---|
| 3,865,759 | 2/1975 | Smith | 521/154 |
| 4,590,222 | 5/1986 | Bauman | 521/154 |
| 4,719,243 | 1/1988 | Pocknell | 521/154 |
| 4,851,452 | 7/1989 | Gross et al. | 521/154 |
| 4,871,782 | 10/1989 | Modic | 521/154 |
| 4,954,533 | 9/1990 | Modic et al. | 521/154 |
| 4,972,001 | 11/1990 | Kimura | 521/154 |
| 5,162,397 | 11/1992 | Descamps et al. | 521/154 |

FOREIGN PATENT DOCUMENTS

| | | |
|---|---|---|
| 584277 | 9/1959 | Canada . |
| 8755 | 4/1969 | Japan . |
| 46352 | 3/1976 | Japan . |

*Primary Examiner*—Morton Foelak
*Attorney, Agent, or Firm*—Robert Spector

[57] ABSTRACT

The presence in curable, foamable organosiloxane compositions of an organosiloxane containing at least one diphenylsiloxane unit, a triorganosiloxane unit and a silanol group imparts a high expansion ratio, an excellent moldability, and an excellent storage stability, and that is not subject to post-cure whitening.

2 Claims, No Drawings

FOAMABLE ORGANOSILOXANE COMPOSITION

BACKGROUND OF THE INVENTION

1. Field of the Invention

The present invention relates to foamable organosiloxane compositions. More particularly, this invention relates to foamable organosiloxane compositions exhibiting a high expansion ratio and the absence of incompatible ingredients causing post-cure whitening

2. Background Information

Known methods for preparing elastomeric organosiloxane foams at room temperature include (i) the addition of an organic foaming or blowing agent to a room-temperature-curable organosiloxane composition and (ii) the preparation of an intrinsically foamable room temperature curable organopolysiloxane composition. In the latter method (ii) curing and foaming are simultaneously induced by means of a dehydrogenation reaction between a silanol-containing polyorganosiloxane and an SiH-containing organosilicon compound. This type of reaction is disclosed in Japanese Patent Publication Number Sho 33-9297 [9,297/1958], Japanese Patent Publication Number Sho 44-8755 [8,755/1969], and Japanese Patent Application Laid Open [Kokai or Unexamined] Number Sho 51-46352 [46,352/1976].

A disadvantage of method (ii) is the low expansion ratio. Specifically, because foaming and curing proceed simultaneously in these methods and therefore cannot be subjected to an independent, deliberate control, good foaming conditions essentially cannot be obtained in the case of molding by foaming in a mold and in the case of injection into a gap or crevice for foaming.

These expansion ratio of foams prepared using method ii can be substantially increased by the addition of diphenylmethylsilanol (DPMS) to the foamable organosiloxane composition. However, because the DPMS and condensates thereof separate out at the surface of the foam after curing, this method suffers from the drawback of products having a grossly impaired external appearance. Another disadvantage of DPMS is its poor compatibility with the other organosiloxane ingredients of the foamable composition, resulting in separation of the DPMS during storage.

The present inventors conducted extensive investigations to solve the aforementioned drawbacks. As a result, they discovered that these drawbacks can be overcome in a single stroke by the addition of a specific polyorganosiloxane to a room-temperature-curable organosiloxane composition whose cure proceeds via dehydrogenation. The present invention was achieved based on this discovery.

One objective of the present invention is to provide a foamable organosiloxane composition that has a high expansion ratio, an excellent moldability, and an excellent storage stability, and that is not subject to post-cure whitening.

SUMMARY OF THE INVENTION

The objectives of this invention are achieved by adding to the foamable organosiloxane composition a specified type of polyorganosiloxane containing at least one diphenylsiloxane unit, a silanol group and a triorganosiloxane unit.

DETAILED DESCRIPTION OF THE INVENTION

This invention provides a foamable curable organosiloxane composition comprising
(A) 100 weight parts of a curable polyorganosiloxane that contains at least two silanol groups per molecule and exhibits a viscosity at 25° C. of from 1,000 to 1,000,000 centipoise (1 to 1000 Pa.s):
(B) 0.1 to 50 weight parts of a polyorganosiloxane with the general formula

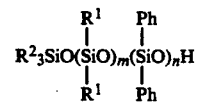

wherein $R^1$ and $R^2$ each represent monovalent hydrocarbon radicals, Ph represents the phenyl radical, m is an integer with a value of zero to 10, and n is an integer with a value of 1 to 10,
(C) an organohydrogensiloxane containing at least 2 silicon-bonded hydrogen atoms in each molecule and exhibiting a viscosity at 25° C. of 1 to 1,000,000 centipoise, where the concentration of said organohydrogensiloxane is equivalent to a molar ratio of silicon bonded hydrogen atoms to silanol groups in said composition of from 0.5 to 30, and
(d) a catalytic quantity of a condensation reaction accelerating catalyst.

The polyorganosiloxane referred to as ingredient A of the present compositions contains at least 2 silicon-bonded hydroxyl (silanol) groups in each molecule. These silanol groups can be bonded at the molecular chain terminals, along the molecular chain as pendant groups or at both positions. The organic groups bonded to the silicon atoms of ingredient A are include both substituted and unsubstituted monovalent hydrocarbon radicals, and are exemplified by alkyl radicals such as methyl. ethyl, propyl, and octyl; aryl radicals such as phenyl; and substituted alkyl radicals such as 3,3,3-trifluoropropyl.

In most cases, polyorganosiloxanes with straight-chain or branched structure will be used for ingredient A, however, cyclic structures and network structures can also be present. Moreover, this ingredient can be a single species or a mixture of two or more species. Ingredient A should have a viscosity at 25° C. of from 1000 to 1,000,000 centipoise (1 to 1,000 Pa.s), preferably from 1000 to 100,000 centipoise (1 to 100 Pa.s). When the viscosity is below 1,000 centipoise, the cured organopolysiloxane foam will have low elongation and will be brittle. On the other hand, only a very small expansion ratio is obtained when its viscosity exceeds 1,000,000 centipoise.

The polyorganosiloxane referred to as ingredient B of the present compositions is the distinguishing feature of these compositions. This polyorganosiloxane has the general formula

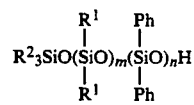

In this formula, $R^1$ and $R^2$ are monovalent hydrocarbon radicals that include but are not limited to alkyl, e.g., methyl, ethyl, and propyl. Ph represents the phenyl radical. The subscript m represents an integer with a value of zero to 10, and the subscript n represents an integer with a value of 1 to 10. The presence of this ingredient containing both triorganosiloxane and diphenylsiloxane units is the most characteristic feature of the present compositions.

Because ingredient B contains only 1 silanol group in each molecule, crosslinking structures are not formed by its reaction with the organohydrogensiloxane to produce hydrogen. In addition, this silanol group, which is bonded to a silicon atom that in turn is bonded to two phenyl groups, is more reactive with the —SiH group than the silanol groups of ingredient A. As a consequence, the silanol group in ingredient component B reacts to produce hydrogen before the silanol groups in ingredient A. This delays the time at which the production of crosslinking structures and foam generation begin to occur simultaneously and as a result makes possible molding into various shapes.

The presence of the triorganosiloxy group prevents ingredient B from migrating to the surface of the foam after curing, thereby preventing exterior staining of the molding surface. Moreover, the compatibility between ingredients A and B is improved, resulting in an inhibition of separation of the liquid foamable organosiloxane composition prior to curing.

The concentration of ingredient B should be from 0.1 to 50 weight parts, preferably from 1 to 20 weight parts, per 100 parts of ingredient A. Little increase in the expansion ratio is observed at below 0.1 part while a satisfactory mechanical strength is not obtained at concentrations in excess of 50 parts.

The organohydrogensiloxane referred to as ingredient C contains at least 2 silicon-bonded hydrogen atoms in each molecule. These can be bonded at the molecular chain terminals, along the molecular chain as pendant groups or at both positions. The silicon-bonded organic groups in ingredient C are monovalent hydrocarbon radicals that include but are not limited to alkyl such as methyl, ethyl, propyl, and octyl; aryl such as phenyl; and substituted alkyl such as 3,3,3-trifluoropropyl. In most cases, the molecular configuration of the organohydrogensiloxane will be straight chain, but branched, three-dimensional, and cyclic structures can also be used. ingredient C may constitute only a single species or a mixture of two or more species.

Ingredient C should have a viscosity at 25° C. of from 1 to 1,000,000 centipoise (0.001 to 1000 Pa.s), preferably from 1 to 1,000 centipoise (0.001 to 1 Pa.s). This ingredient becomes very volatile at viscosities below 1 centipoise and its content in the foamable organopolysiloxane composition will then be unstable. Its handling becomes problematic at viscosities in excess of 1,000,000 centipoise.

The concentration of ingredient C should be sufficient to provide a molar ratio of silicon-bonded hydrogen atoms to silanol groups in the curable composition of from 0.5 to 30 preferably from 1.5 to 10.

Little increase in the expansion ratio is observed when this ratio is less than 0.5 moles, while a satisfactory mechanical strength is not obtained at a ratio above 30.

Ingredient D of the present compositions is a catalyst to accelerate the dehydrogenation/condensation reaction responsible for foaming and curing of the present compositions. The nature of this ingredient is not specifically restricted, and the present compositions can employ any of the known condensation reaction catalysts.

Suitable catalysts include but are not limited to tin compounds such as stannous octoate, dibutyltin dilaurate, and dibutyltin dioctoate; and compounds of metals from the platinum group of the Periodic Table such as chloroplatinic acid and chloroplatinic acid/divinyltetramethyldisiloxane complexes.

The foamable organosiloxane compositions of the present invention are prepared simply by mixing the ingredients of the present compositions to homogeneity.

Insofar as the objectives of the present invention are not compromised, the present compositions can also contain the following ingredients: diluents such as triorganosiloxy-terminated polyorganosiloxanes; agents for adjusting the foaming and cell properties such as low-viscosity alpha,omega-dihydroxypolyorganosiloxanes, polyorganosiloxanes containing Si-bonded perfluoroalkyl radicals; hydrosilylation-reaction inhibitors as used for platinum containing catalysts, such as alcohols of the formula R—OH and carboxylic acids of the formula R—COOH in which R represents an organic group such as alkyl alkenyl, alkenyl, and, aryl radicals and ether groups of the formula —OR' where R' is a divalent hydrocarbon radical; fillers; pigments; thermal stabilizers; and flame retardants.

The following examples describe preferred embodiments of the present compositions and should not be interpreted as limiting the scope of the invention defined in the accompanying claims. In these examples, viscosities are measured at 25° C., cp is an abbreviation for centipoise, and Ph represents the phenyl radical.

EXAMPLE 1

Foamable organosiloxane compositions designated as sample 1 and sample 2 were prepared by mixing the following ingredients using the proportions reported in Table 1:

an alpha,omega-dihydroxypolydimethylsiloxane with a viscosity of 4,000 cp (4 Pa.s) (A-1), a silanol-terminated polydimethylsiloxane with viscosity of 80 cp (0.08 Pa.s) (A-2).

trimethylsiloxydiphenylsilanol (B-1) with the average structural formula

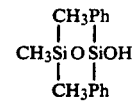

a trimethylsiloxy-terminated polymethylhydrogensiloxane with viscosity of 20 cp (0.02 Pa.s)(C-1), and stannous octoate (D-1).

For the purposes of comparison a foamable organopolysiloxane composition designated as sample 3 (comparison example) was prepared as described in the preceding section of this example, except for omitting the trimethylsiloxydiphenylsilanol (B-1). These samples were prepared as follows: the specified quantities of (A-1), (A-2), (B-1), and (C-1) were first mixed, and the stannous octoate catalyst (D-1) was then added with mixing. A specified quantity of the particular foamable organopolysiloxane composition was then poured into a container of known volume having the shape of a rectangular parallelepiped.

Both compositions yielded cured silicone foams after standing for 5 minutes at 25° C. Each foam was cut off even with the top of the container, was removed from the container, and its density was calculated from its weight and volume. The expansion ratio was calculated from the specific gravity of the starting liquid foamable organopolysiloxane composition. The following characteristics were also examined as the basis for evaluating the moldability: the external appearance of the foam (condition of the surface and corners) and the size and uniformity of the cells in cross section.

The results reported in Table 1 demonstrate that the addition of trimethylsiloxydiphenylsilanol (B-1) led to an increase in the expansion ratio as well as to an improvement in the moldability.

TABLE 1

| Ingredients (weight parts) | present invention sample 1 | sample 2 | comparison example sample 3 |
|---|---|---|---|
| A-1 | 100 | 100 | 100 |
| A-2 | 20 | 20 | 20 |
| B-1 | 5 | 10 | — |
| C-1 | 10 | 10 | 10 |
| D-1 | 4 | 4 | 4 |
| expansion ratio | 3.0 | 5.3 | 2.2 |
| moldability | excellent | excellent | poor (see note) |

Note: The molding did not conform to the molding box (specifically, the corners of the molding were rounded and the surface was uneven and irregular).

EXAMPLE 2

A sample 4 was prepared by mixing the following ingredients in the proportions reported in Table 2:

an alpha,omega-dihydroxypolydimethylsiloxane with viscosity of 4,000 cp (4 Pa.s) (A-1), an alpha,omega-dihydroxypolydimethylsiloxane with viscosity of 80 cp (0.08 Pa.s) (A-2), a trimethylsiloxydiphenylsilanol (B-1) with the formula

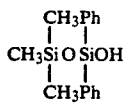

a trimethylsiloxy-terminated polymethylhydrogensiloxane with a viscosity of 20 cp (C-1), stannous octoate (D-1) as the catalyst, and carbon black as pigment.

For purposes of comparison, a foamable organosiloxane composition designated as sample 5 (comparison example) was also prepared as above, but in the present case adding diphenylmethylsilanol (B-2) of the formula MePh$_2$SiOH in place of the trimethylsiloxydiphenylsilanol (B-1).

Silicone rubber foams were prepared as in Example 1 from the foamable organosiloxane compositions comprising samples 4 and 5. The condition of the foams was evaluated both immediately after foaming and after the foam had stood for 4 weeks at room temperature. These results are reported in Table 2.

The results in Table 2 demonstrate that the composition containing trimethylsiloxydiphenylsilanol (B-1) was much more resistant to post-cure whitening due to bleed out of component (B) or condensate thereof than the composition that contained trimethylsiloxy-free diphenylmethylsilanol (B-2).

TABLE 2

| Ingredients (Wt. Pts.) | present invention sample 4 | comparison example sample 5 |
|---|---|---|
| A-1 | 100 | 100 |
| A-2 | 20 | 20 |
| B-1 | 10 | — |
| B-2 | — | 10 |
| C-1 | 10 | 10 |
| D-1 | 4 | 4 |
| carbon black | 5 | 5 |
| immediately after foaming | + | + |
| after 4 weeks | + | x |

+ = excellent black color
x = became dark grey due to whitening

EXAMPLE 3

Foamable organosiloxane compositions designated as samples 6 and 7 were prepared by mixing polydimethylsiloxane (A-1) and (D-1) as described in Example 1 in the proportions reported in Table 3. Sample 7 was a comparison example. The condition of these compositions was evaluated both immediately after mixing and after remaining undisturbed for 1 week at room temperature, and these results are reported in Table 3.

The results reported in Table 3 demonstrate that the foamable organoxiloxane composition containing trimethylsiloxydiphenylsilanol (B-1) was much more resistant to separation of ingredients during storage than the foamable organosiloxane composition that contained trimethylsiloxy-free diphenylmethylsilanol (B-2). An excellent storage stabiliity was thus confirmed for the composition containing ingredient B-1.

TABLE 3

| Ingredients (wt. pts.) | present invention sample 6 | comparison example sample 7 |
|---|---|---|
| A-1 | 100 | 100 |
| A-2 | 20 | 20 |
| B-1 | 10 | — |
| B-2 | — | 10 |
| C-1 | 10 | 10 |
| D-1 | — | — |
| immediately after mixing | transparent liquid | turbid white liquid |
| after 1 week | transparent liquid | separation |

That which is claimed is:

1. A foamable organosiloxane composition comprising (A) 100 weight parts of a polyorganosiloxane containing at least 2 silanol groups in each molecule and exhibiting a viscosity at 25° C. of from 1,000 to 1,000,000 centipoise, (B) from 0.1 to 50 weight parts organopolysiloxane with the general formula

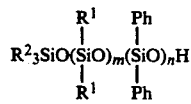

wherein R$^1$ and R$^2$ each represent monovalent hydrocarbon radicals, Ph represents the phenyl radical, m is an integer with a value of zero to 10, and n is an integer with a value of from 1 to 10, (C) an organohydrogensiloxane containing at least 2 silicon-bonded hydrogen atoms in each molecule and exhibiting a viscosity at 25° C. of from 1 to 1,000,000 centipoise, where the concentration of the organohydrogensiloxane is equivalent a molar ratio of silicon bonded hydrogen atoms to silanol groups in said composition of from 0.5 to 30, and (D) a catalytic quantity of a condensation reaction catalyst.

2. A foamable organosiloxane composition according to claim 1 wherein said condensation reaction catalyst is selected from the group consisting of tin compounds and compounds of metals from the platinum group of the periodic table, the concentration of polyorganosiloxane B is from 1 to 20 parts by weight, the organic groups of polyorganosiloxane A, B, and said organohydrogensiloxane are monovalent hydrocarbon radicals and the hydrocarbon radicals on said organohydrogensiloxane are free of ethylenic unsaturation; the viscosity of polyorganosiloxane A is from 1 to 1000 Pa.s, the viscosity of said organohydrogensiloxane is from 0.001 to 1000 Pa.s, and the concentration of said organohydrogensiloxane is equivalent to a molar ratio of silicon-bonded hydrogen atoms to silanol groups of from 1.5 to 10.

* * * * *